United States Patent [19]
Fritsch

[11] Patent Number: 5,551,929
[45] Date of Patent: Sep. 3, 1996

[54] DIFFERENTIAL TRACTION DRIVE TRANSMISSION

[76] Inventor: Joseph E. Fritsch, 14001 Sherwood, Oak Park, Mich. 48237

[21] Appl. No.: 46,486

[22] Filed: Apr. 12, 1993

[51] Int. Cl.[6] ............................................. F16H 13/06
[52] U.S. Cl. ........................ 476/67; 476/39; 476/50; 475/183
[58] Field of Search ........................... 475/193, 183, 475/184; 476/36, 37, 38, 39, 67, 50, 70

[56] References Cited

U.S. PATENT DOCUMENTS

| | | | |
|---|---|---|---|
| 1,370,080 | 3/1921 | Ahond | 475/193 |
| 1,737,997 | 12/1929 | Garrard | 475/183 |
| 2,020,667 | 11/1935 | Erban | 188/184 |
| 2,469,653 | 5/1949 | Kopp | 476/37 |
| 2,509,940 | 5/1950 | Rennerfelt | 476/49 |
| 2,745,298 | 5/1956 | Braunagel et al. | 475/183 |
| 3,099,927 | 8/1963 | Anderson | 475/159 |
| 3,318,164 | 5/1967 | McCollum | 475/8 |
| 3,490,313 | 1/1970 | Astrov et al. | 475/185 |
| 4,369,667 | 1/1983 | Kemper | 475/8 |
| 4,424,726 | 1/1984 | Galbraith | 475/185 |
| 5,037,361 | 8/1991 | Takahashi | 475/183 X |
| 5,051,106 | 9/1991 | Fritsch | 475/191 |

FOREIGN PATENT DOCUMENTS

| | | | |
|---|---|---|---|
| 1240533 | 8/1960 | France | 476/39 |
| 1090515 | 10/1960 | Germany | 475/183 |
| 3804648 | 10/1988 | Germany | 475/193 |
| 3939102 | 6/1990 | Germany | 475/183 |
| 3-153947 | 6/1991 | Japan | 475/183 |
| 4-004347 | 1/1992 | Japan | 475/183 |

*Primary Examiner*—Leslie A. Braun
*Assistant Examiner*—David W. Laub

[57] ABSTRACT

A traction-type transmission which uses a differential reduction principle whereby the present transmission can generate an extremely high output shaft torque, while maintaining a relatively low tangential force through the traction contact. The traction elements of the present invention operate at a relatively high surface speed whereby a finite tangential force, transmitted through the traction contacts, represents more power through the transmission. The geometry of the mating traction elements produces a traction contact shape which is very long, in the rolling direction, and narrow in width. This traction contact geometry greatly increases the coefficient of traction, since traction is directly related to the buildup of lubricant strain in the rolling direction. In addition, this narrow traction contact shape virtually eliminates fluid shear. Thus, this traction contact shape not only increases the power capacity of the present invention, but also greatly increases its efficiency. The present invention has a very short power path consisting of only two traction contacts, however it can attain a very high input/output ratio in a single stage.

14 Claims, 3 Drawing Sheets

DIFFERENTIAL TRACTION DRIVE TRANSMISSION

TECHNICAL FIELD

The present invention relates generally to traction drive transmissions, and more particularly, to a traction drive transmission of the planetary type, having a very high power to weight ratio, and a high input/output reduction ratio capability.

BACKGROUND OF THE INVENTION

Traction drive transmissions are well known and have been used for years in applications where efficiency, and the power to weight ratio, were not of primary concern. Up to the present time, due to their multiple power paths, the most successful of the commercially available traction drives has been the planetary type or the multidisc type. However, even these are high weight to power units. High power density traction drives have proved to be far more difficult to perfect, and there are very few, if any, examples in use today. The inherent advantages of using rollers rather than gears to transmit power, such as smooth, vibration free power transfer, are offset by equally significant design problems. Foremost of these problems is the very low coefficient of traction. This severely limits the tangential force that can be transmitted through the traction engagement area. In a conventional traction drive, the amount of tangential force required is a function of the output torque. This is why one rarely sees a conventional traction drive with an input/output speed ratio above 7:1.

In order to transmit any appreciable power through the traction engagement area, an extremely high force, normal to the traction engagement area, must be used. This force imposes considerable load on the support bearings and support structure. This is the principal reason that conventional traction drives have such a low power density.

To reduce Hertzjan stress, the traction engagement area is enlarged. However, the geometry of existing traction drives allows very little flexibility in the size or shape of its traction engagement area. The length of the engagement area (in the rolling direction) is predetermined by the rolling radius of the mating elements. The only parameter which can be changed is the width. Thus, the majority of traction drives in use today, have engagement area ellipses in which the average width of the engagement area (transverse to the rolling direction) can be four times the length. Although rolling motion is intrinsically very efficient, with losses approaching zero, power losses caused by the lubricant can be significant. The two primary causes are; shearing of the lubricant and pressure transients of the lubricant, in the engagement area. In general, the wider the engagement area, the higher the power losses. These power losses show up in the form of heat. U.S. Pat. Nos. 2,020,667, 1935; U.S. Pat. 3,099,927, 1963; U.S. Pat. 3,318,164, 1967; and U.S. Pat. 4,369,667, 1983, demonstrate the persistence of this problem. The fact that many conventional traction drives use excessive force, normal to the engagement area, is further evidence of the efforts being made to increase the capacity of these traction drives without further increasing the width of the engagement area.

While these disadvantages are overcome in U.S. Pat. No. 5,051,106, 1991, it should be observed that the axes of some of the shafts in this transmission are transverse. Whereas, all the shafts of the present invention are parallel, thus simplifying the machining.

For the most part, the gains made in traction drive technology in the past have come about from improvements made in the fields of metallurgy and lubrication, and not from major breakthroughs in traction drive design.

DISCLOSURE OF THE INVENTION

It is an object of the present invention to provide a transmission which employs surfaces for conveying rotational energy, such as traction surfaces, instead of gears to transmit power.

It is also an object of the present invention to provide a traction drive transmission which can transmit significantly more power, without increasing the tangential force through the traction engagement area. It is therefore an object of the present invention to provide a transmission which does not depend on large differences in radii of the mating elements, to obtain the required speed ratio. Rather, the present invention incorporates an epicyclic differential principle, whereby the highest input/output speed ratio is achieved as the radii of the elements approach similarity. This reduction principle greatly reduces the overall size and weight of the transmission.

More specifically, it is an object of the present invention to provide a transmission of the type set forth above, in which the traction elements operate at a relatively high surface velocity, so that a finite tangential force, transmitted through the engagement areas, delivers more power through the transmission.

Another object of the present invention is to improve the geometry of the mating traction elements, thereby improving the shape of the engagement area. This greatly increases the overall capacity and efficiency of the engagement area.

The foregoing objects, and other objects and advantages which will become apparent, are achieved by providing concentric input and output shafts, which rotate about the first axis of rotation. The input shaft having a means, such as a carrier, for rotatably supporting at least one compound-planet. Each compound-planet incorporates two traction surface areas. The compound-planet's first traction surface area engages a reaction disc's traction surface. The reaction disc has means for restraining rotary motion. The second traction surface area of the compound-planet engages an output disc's traction surface. The output disc is rotatable with the output shaft. The engagement areas of the compound-planet's first and second traction surface are located on the same side of the rotational axis of the compound-planet.

This unusual design configuration gives the present invention an enormous advantage over conventional traction drives. The present invention can attain very high input/output speed ratios (low output shaft speed), while maintaining high traction element surface speeds. The advantage is, that the tangential force, through the engagement area, is a function of the input torque rather than the output torque. Thus, the present invention can generate extremely high output shaft torque, while maintaining a relatively low tangential force through the engagement area.

Another advantage of the foregoing construction is that the geometric shape of the engagement area, which is formed by the mating traction elements, is very narrow and long. Also the major axis of the engagement area is parallel to the rolling direction and thus, the direction of the engagement area's tangential force. This engagement area shape greatly increases the coefficient of traction, since traction is directly related to the buildup of lubricant strain in the rolling direction. At the same time, this engagement area shape virtually eliminates spin related fluid shear. These factors not only increase the capacity of the present invention, but also greatly increase its efficiency.

BRIEF DESCRIPTION OF DRAWINGS

The foregoing features will be more fully understood after consideration of the following detailed description taken in conjunction with the accompanying drawings, in which.

DETAILED DESCRIPTION

Figure 1:
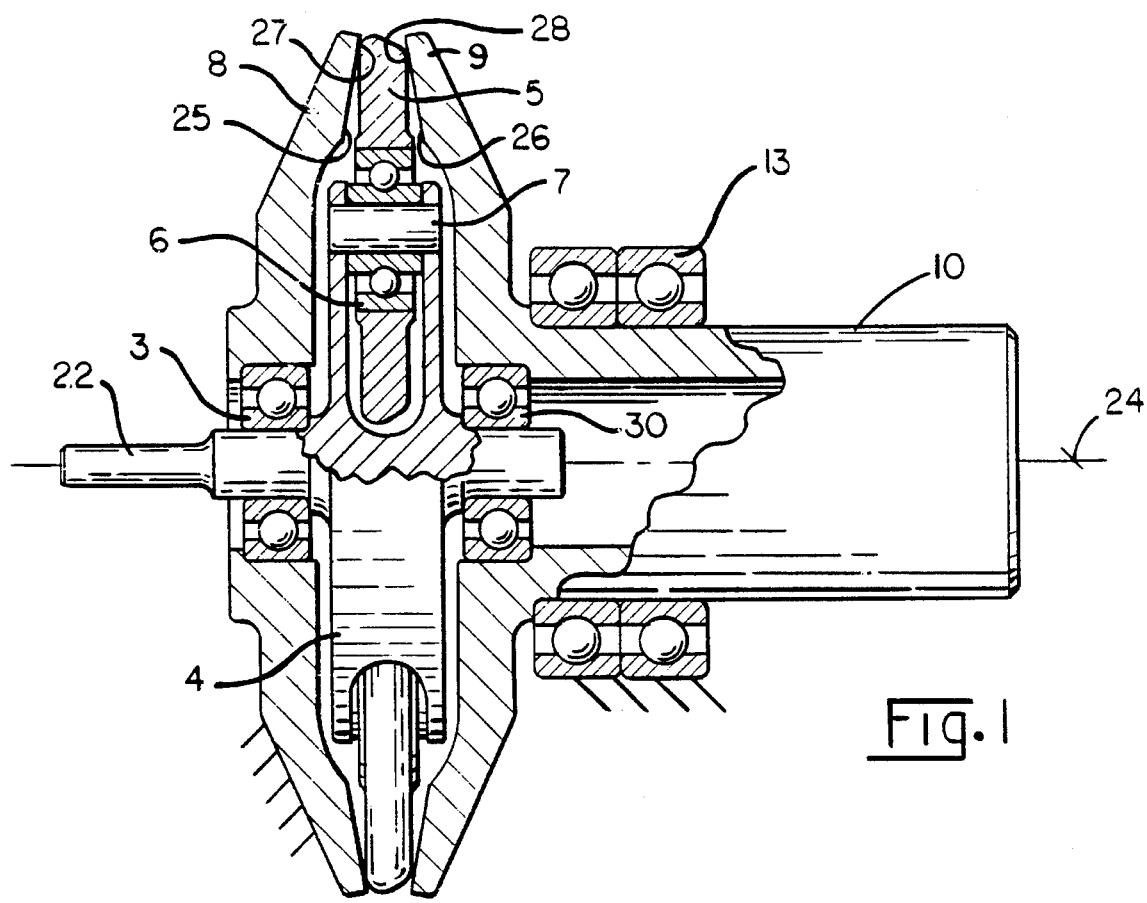
FIG. 1 is a cross-sectional view through a differential traction drive transmission, embodying the features of the present invention.

Referring first to FIG. 1, the embodiment shown comprises an input shaft 22 which rotates about the first axis of rotation 24. The input shaft is rotatably supported by bearings 3 and 30. A carrier 4 is arranged to rotate with the input shaft, about the first axis of rotation. The carrier includes at least one planet pin 7, whose axis is parallel to the first axis of rotation. Each planet pin supports a planet bearing 6 which in turn, rotatably supports a compound-planet 5. Two compound-planets are shown in FIG. 1, however, three are normally used. Each compound-planet has two traction surfaces. The compound-planet's first traction surface 27 is engaged with an inwardly facing, substantially conical shaped traction surface 25 of a reaction disc 8. The reaction disc is supported coaxially with the first axis of rotation and is restrained from rotation. The apex of the reaction disc's conical traction surface is located on the first axis of rotation. The compound-planet's second traction surface 28 is engaged with an inwardly facing, substantially conical shaped traction surface 26 of an output disc 9. The apex of the output disc's conical traction surface is located on the first axis of rotation. The output disc rotates with an output shaft 10 about the first axis of rotation. The output shaft is rotatably supported by an output shaft bearing 13.

It should be noted that the engagement areas on the first traction surface and the second traction surface, of the compound-planet, are located on the same side of the axis of the compound-planet. The engagement area shape is approximately that of a long, narrow oval, with the major axis in the direction of rolling. This geometry greatly increases the coefficient of traction, since traction is directly related to the buildup of lubricant strain in the rolling direction. Additionally, this engagement area shape virtually eliminates spin related fluid shear, thereby greatly increasing efficiency. In a lubricated traction drive, the traction elements do not actually touch. The traction surfaces of the elements are separated by a very thin lubricant film.

Also it should be noted that in the present invention, almost complete control of the engagement area size and shape is achieved by combining various values of conical angle, of the reaction disc and the output disc, and toroidal transverse radius of the compound-planet. In general, the angle of the conical surface controls the length of the engagement area in the rolling direction, with all other variables held constant. The width of the engagement area is a function of the transverse radius of the toroidal surface of the compound-planet.

In operation, the input is through input shaft 22. The first traction surface 27 of the compound-planet 5 is driven around the conical shaped traction surface 25 of the non-rotating reaction disc 8, by the input shaft carrier 4. Simultaneously, the compound-planet's second traction surface 28 is also rotating about the conical shaped traction surface 26 of the output disc 9. Any relative difference between the radii of the compound-planet and reaction disc to the radii of the compound-planet and output disc, shows up as rotation of the output disc.

Figure 2:
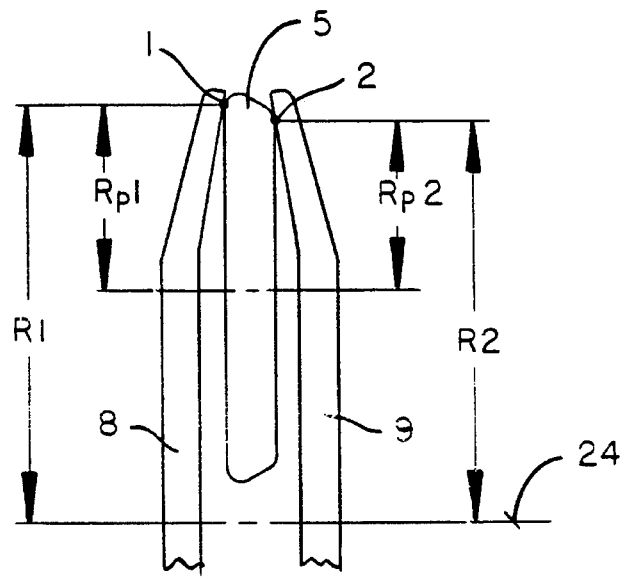
FIG. 2 is a partial cross-sectional schematic of the traction elements.

Referring now to FIG. 2, which is a partial cross-sectional schematic of the traction elements. At engagement area 1 (between the compound-planet and the reaction disc), the traction radius of the compound-planet Rp1 and the traction radius of the reaction disc R1 are both larger than the traction radius of the output disc R2 and the compound-planet Rp2, at engagement area 2 (between the compound-planet and the output disc). The relative difference in radius of the compound-planet Rp2 is greater than the relative difference in radius of the output disc R2. Thus, rotation is generated in the output shaft.

While I believe that the input/output speed ratio is expressed as shown below, I do not wish to be bound by this.

$$\text{Ratio} = \frac{1}{1 - \frac{Rp2\,R1}{R2\,Rp1}}$$

It should be noted from above that, the present invention does not depend on large differences in radii of the elements to obtain the required input/output speed ratio. Instead, the present invention uses an epicyclic differential principle, whereby the highest input/output speed ratio is achieved as the radii of the elements approach similarity. Therefore, the surface velocity at the engagement area does not change appreciably, regardless of the input/output speed ratio.

Thus, unlike conventional traction drives, the tangential force requirement of the engagement areas of the present invention does not increase with an increase of the input/output speed ratio. Consequently, at the higher input/output speed ratios, the force normal to the engagement area is only a small fraction of that required for a conventional traction drive.

Figure 3:
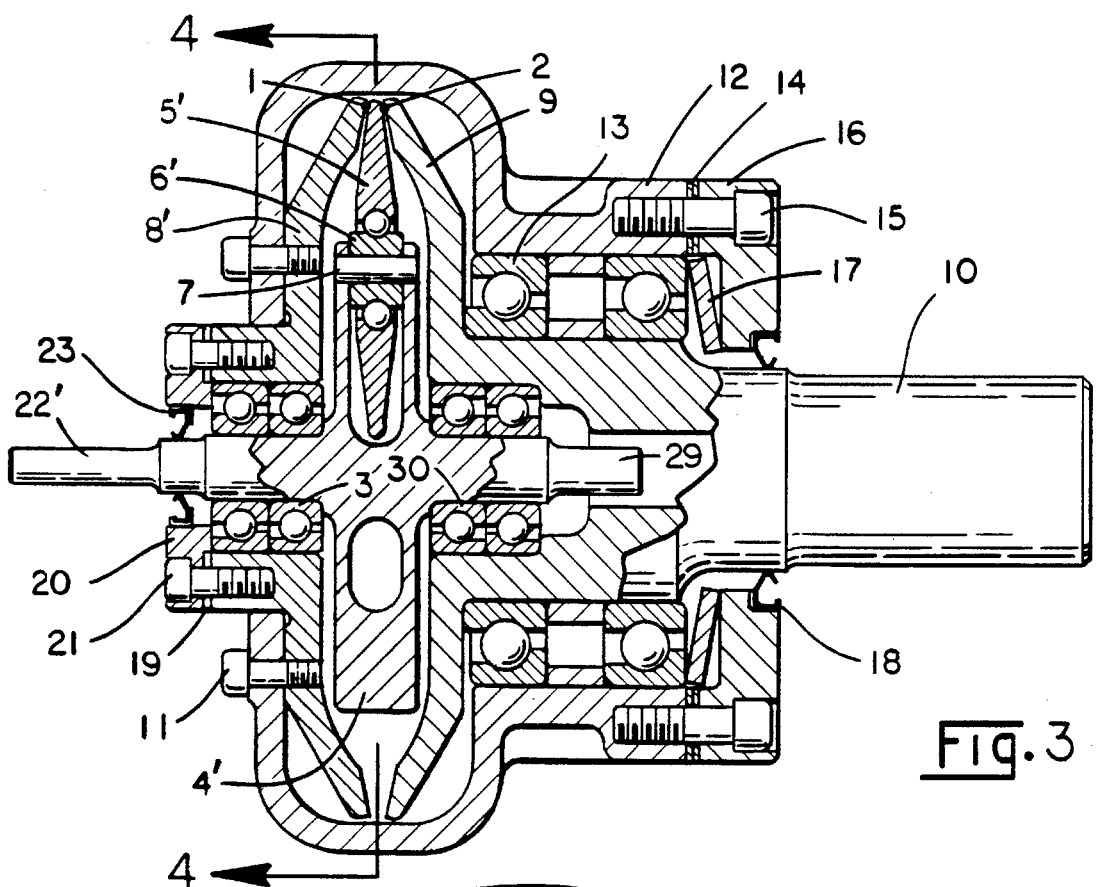
FIG. 3 is a cross-sectional view, showing another embodiment of the present invention.

Referring now to FIG. 3, which is a cross-sectional view through another embodiment of the present invention. A housing, indicated generally at 12, includes an input cap 20, which retains input carrier bearings 3, which rotatably supports an input shaft 22'. The input cap also retains input shaft seal 23. The input cap is secured by screws 21. As shown above, the force normal to the engagement area is only a small fraction of that required for a conventional traction drive. It must be appreciated therefore, that while a conventional traction drive must incorporate means such as the commonly used ball and ramp loading mechanism to prevent slippage of the engagement areas at high output torque loads, this would not be necessary for the majority of applications of the present invention. A means, such as spring washer 17, is used to provide both the engagement area preload, and to maintain the normal force on the engagement area as well. The spring force is transferred through output shaft bearings 13 to the output disc 9. The spring is restrained by bearing cap 16. Shims 14 are used as a force adjusting means. Means such as shims 19 could be used to preload the present invention. Another means of obtaining the normal force would be to machine the parts, to automatically provide a preload when the present invention is assembled. It must be appreciated that, depending on the use of the present invention, the means for maintaining an engagement clamping force, could be located at several locations. Bearing cap 16 is secured by screws 15, and supports an output shaft seal 18. The output shaft bearings 13 rotatably support an output shaft 10 which, in turn, supports carrier bearings 30. A carrier 4' is arranged to rotate with the input shaft 22', about the first axis of rotation. The carrier has a plurality of planet pins 7 at spaced intervals. Each planet pin supports planet bearing 6', which rotatably supports a compound-planet 5'. Three compound-planets are used in the preferred embodiment but less than or more than three could be used. Each compound-planet engages a reaction disc 8' through engagement area 1. A retainer means, such as screw 11, prevents rotary motion of the reaction disc. The compound-planet also engages an output disc 9 through engagement area 2. This embodiment also shows an extension 29 on the output side of the input shaft 22'. This extension could be lengthened coaxially through the output shaft 10 and serve as the input shaft. By this means the input and output shafts would be on the same side of the present invention.

It should be noted that the planet bearing 6' is not subjected to high loads. One of the advantages of the present invention is that, the engagement area's normal force is significantly lower than that used on a conventional traction drive. In addition, the compound-planet's two engagement areas are on opposed surfaces which, in turn, are approximately perpendicular to the axis of the compound-planet. The only basic load reacted to by the bearing would be the moment load caused by the engagement area offset. Thus, the bearing is used primarily as a means to accurately guide the compound-planet's traction surfaces.

It should also be noted that, the compound-planet has a disc-like shape. This has several advantages, such as:

1. It reduces inertia.
2. It reduces the effects of centrifugal force.
3. It reduces the length of the present invention.

Figure 4:
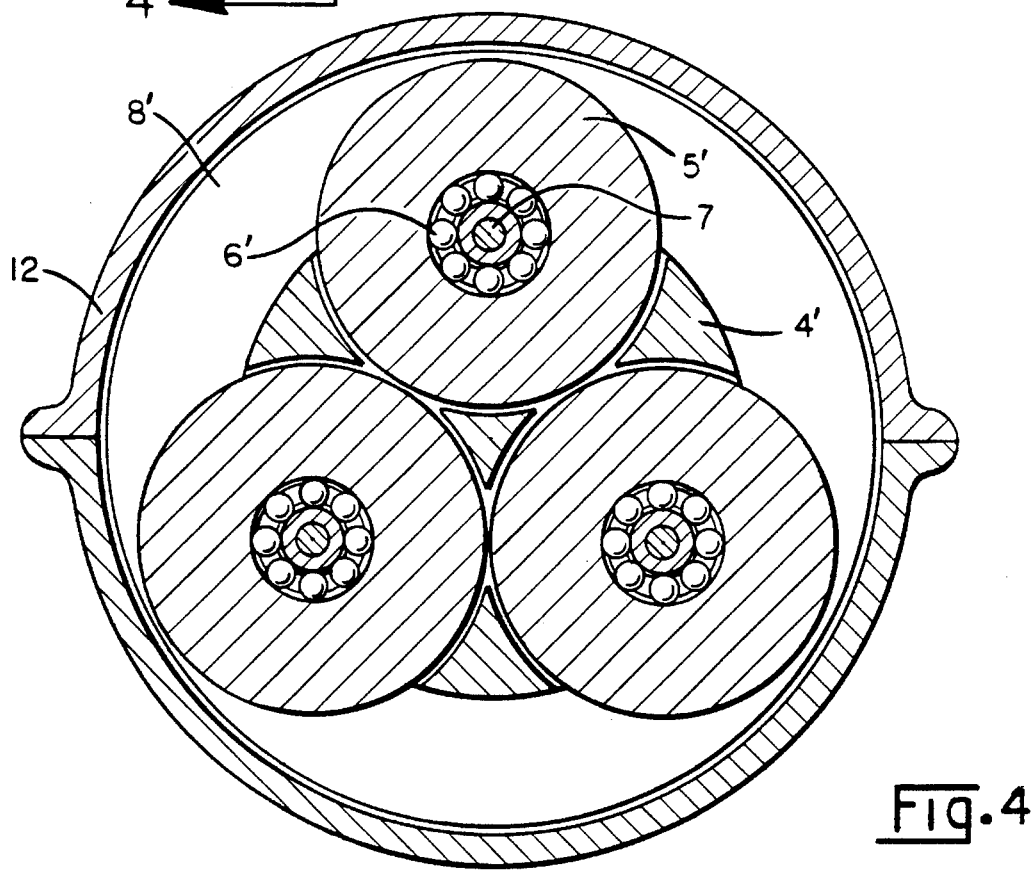
FIG. 4 is a cross-sectional view, taken along plane 4—4 of FIG. 3.

FIG. 4 is a cross-sectional view, taken along plane 4—4 of FIG. 3. This figure clearly shows the construction of the carrier 4'.

Figure 5:
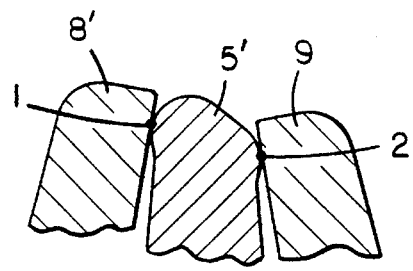
FIG. 5 is an enlarged cross-sectional view of the engagement areas shown in FIG. 3.

FIG. 5 is an enlarged cross-sectional view of the engagement areas shown in FIG. 3. It is important to note that the compound-planet has a toroidal shape at both engagement area 1, and engagement area 2. These toroidal shapes engage the conical shaped reaction disc 8', and output disc 9.

Figure 6:
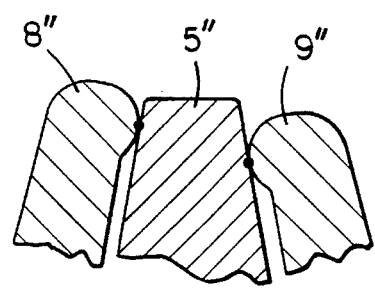
FIG. 6 is an enlarged cross-sectional view of an alternate construction of the engagement areas.

FIG. 6 is an enlarged cross-sectional view, showing an alternate construction of the engagement areas. Wherein, the compound-planet 5" has conical shaped traction surfaces, and the reaction disc 8" and the output disc 9" have toroidal shaped traction surfaces. The resulting shape of the engagement area remains essentially the same as the elements shown in FIG. 5, long and narrow with the major axis in the rolling direction.

Figure 7:
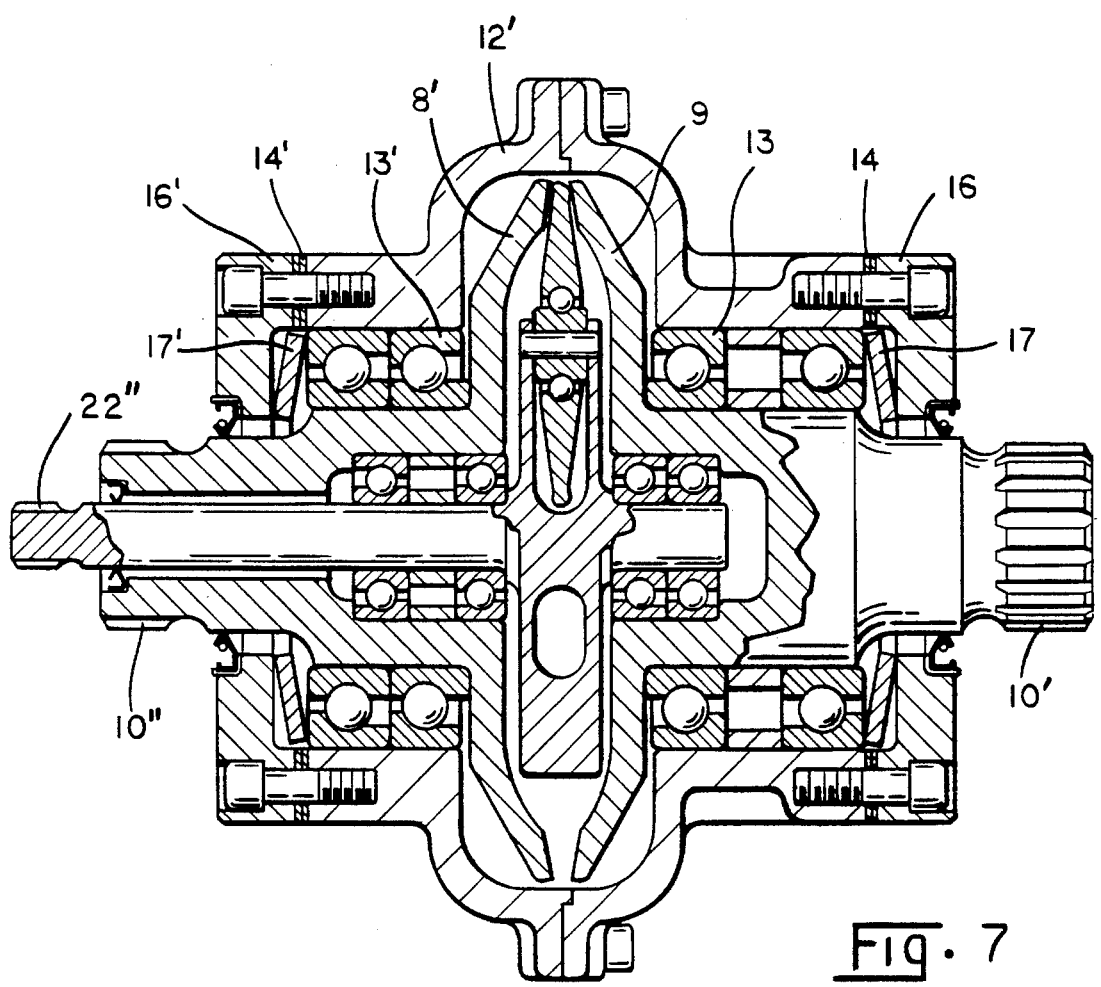
FIG. 7 is a partial cross-sectional view, showing another embodiment of the present invention.

FIG. 7 is a partial cross-sectional view, showing another embodiment of the present invention. This embodiment has two output shafts 10' and 10" extending through both sides of the housing 12' and rotating about the first axis. The input shaft 22" is supported coaxially within the output shaft 10". The reaction disc 8' is free to rotate in bearings 13'. Thus, the reaction torque from output shaft 10' causes output shaft 10" to rotate. Both output shafts are automatically load balanced and have contra-rotation.

While the above descriptions contain many specificities, these should not be construed as limitations on the scope of the invention, but rather, as an exemplification of a few embodiments thereof. Many other combinations and variations are possible. For example:

Using the output shaft 10 as the mounting means would permit the housing 12 to be used as the output.

Using the output shaft 10 for the input, permits the present invention to be used as a "step-up" transmission.

What is claimed as new and desired to be secured by Letters Patent is:

1. A differential traction drive transmission comprising:

an input shaft rotating about a first axis of rotation;

a carrier directly fixed to said input shaft and arranged to rotate with said input shaft about the first axis of rotation, having at least one planet pin;

axis of said planet pin, is substantially parallel to the first axis of rotation;

each said planet pin rotatably supporting a compound-planet;

said compound-planet having only a first surface and a second surface for conveying rotational energy;

said surfaces for conveying rotational energy are located on opposed sides of said compound-planet;

a reaction disc having a surface for conveying rotational energy;

said compound-planet's first surface for conveying rotational energy, engaging said reaction disc's surface for conveying rotational energy;

an output disc having a surface for conveying rotational energy;

said compound-planet's second surface for conveying rotational energy, engaging said output disc's surface for conveying rotational energy;

the engagement areas of the first and second surface for conveying rotational energy located on the same side of the rotational axis of said compound-planet;

a means for maintaining a force, normal to the engagement areas;

said output disc rotatable with an output shaft.

2. The differential traction drive transmission set forth in claim 1, wherein said surfaces for conveying rotational energy include traction surfaces.

3. The differential traction drive transmission set forth in claim 1, wherein said means for maintaining a force normal to the engagement areas includes at least one spring.

4. The differential traction drive transmission, set forth in claim 1, wherein said reaction disc include means restraining rotary motion.

5. The differential traction drive transmission set forth in claim 1, wherein said compound-planet's first and second surfaces for conveying rotational energy, have a substantially toroidal shape, and said reaction disc and said output disc have inwardly facing substantially conical shaped surfaces for conveying rotational energy.

6. The differential traction drive transmission set forth in claim 1, wherein said compound-planet's first and second surfaces for conveying rotational energy, have a substantially conical shape, and said reaction disc and said output disc have inwardly facing substantially toroidal shaped surfaces for conveying rotational energy.

7. The differential traction drive transmission, set forth in claim 1, wherein said compound-planet's first surface and second surface for conveying rotational energy, have traction radii which are unequal.

8. The differential traction drive transmission set forth in claim 1, wherein said input shaft is journaled for rotation within said output shaft.

9. A differential traction drive transmission comprising:

a housing;

an input shaft rotating about a first axis of rotation;

a carrier directly fixed to said input shaft and arranged to rotate with said input shaft about the first axis of rotation, having three planet pins;

axes of said planet pins, substantially parallel to the first axis of rotation;

each said planet pin rotatably supporting a compound-planet having only a first traction surface and a second traction surface;

said traction surfaces are located on opposed sides of said compound-planet;

a reaction disc coaxial with the first axis of rotation having a traction surface;

said reaction disc includes means for restraining rotary motion, relative to said housing;

said compound-planer's first traction surface engaging said reaction disc's traction surface;

said compound-planer's second traction surface engaging an output disc's traction surface;

the engagement areas of the first and second traction surface located on the same side of the rotational axis of said compound planet;

means for maintaining a force normal to the engagement areas;

said output disc rotatable with an output shaft, about the first axis of rotation.

10. The differential traction drive transmission set forth in claim 9, wherein said means for maintaining a force normal to the engagement areas includes at least one spring.

11. The differential traction drive transmission set forth in claim 9, wherein said compound-planet's first and second traction surfaces, have a substantially toroidal shape, and said reaction disc and said output disc have inwardly facing substantially conical shaped traction surfaces.

12. The differential traction drive transmission set forth in claim 9, wherein said compound-planet's first and second traction surfaces, have a substantially conical shape, and said reaction disc and said output disc have inwardly facing substantially toroidal shaped traction surfaces.

13. The differential traction drive transmission, set forth in claim 9, wherein said compound-planet's first and second traction surfaces, have traction radii which are unequal.

14. The differential traction drive transmission, set forth in claim 9, wherein said input shaft and said output shaft, extend out of opposed ends of said housing.

* * * * *